United States Patent [19]

Pearce

[11] Patent Number: 5,086,880

[45] Date of Patent: Feb. 11, 1992

[54] ELEVATOR TRAVELING CABLE GRIP

[75] Inventor: Leonard Pearce, Wanneroo, Australia

[73] Assignee: Otis Elevator Company, Farmington, Conn.

[21] Appl. No.: 595,075

[22] Filed: Oct. 10, 1990

[51] Int. Cl.⁵ .................................................. B66B 9/00
[52] U.S. Cl. ..................................... 187/1 R; 187/20; 248/230
[58] Field of Search ............. 187/1 R, 20; 248/49, 248/230; 24/115 R, 135 A

[56] References Cited

U.S. PATENT DOCUMENTS

| | | | |
|---|---|---|---|
| 2,190,330 | 2/1940 | Martine | 187/1 R |
| 2,604,178 | 7/1952 | Steinmayer | 248/230 |
| 3,430,733 | 3/1969 | Smith | 187/1 R |
| 3,519,101 | 7/1970 | Sieffert | 187/2 |
| 4,548,376 | 10/1985 | DeGore | 248/230 |

FOREIGN PATENT DOCUMENTS 122542 9/1979 Japan ....................... 187/20

Primary Examiner—Robert P. Olszewski
Assistant Examiner—Kenneth Noland
Attorney, Agent, or Firm—William W. Jones

[57] ABSTRACT

A grip device to guide and support a traveling cable on a construction elevator assembly includes an outer metal sleeve having an inner polyvinylchloride liner. The sleeve is formed in two mating parts which telescopingly receive the traveling cable. A plurality of tightening clamps are mounted on the sleeve and bear against one of the liner parts. The liner can thus be tightened onto or loosened from the traveling cable. The construction elevator assembly includes a machine room assembly which operates an elevator for ferrying men and equipment throughout the building during its construction. The machine room is periodically craned upwardly in the building as the latter continues to rise in height. The traveling or power cable must be supported in the hoistway and must be lengthened each time the machine room is lifted, and the sleeve of this invention provides good support for the cable, and can be loosened from the cable each time the latter is lengthened during a jump.

6 Claims, 1 Drawing Sheet

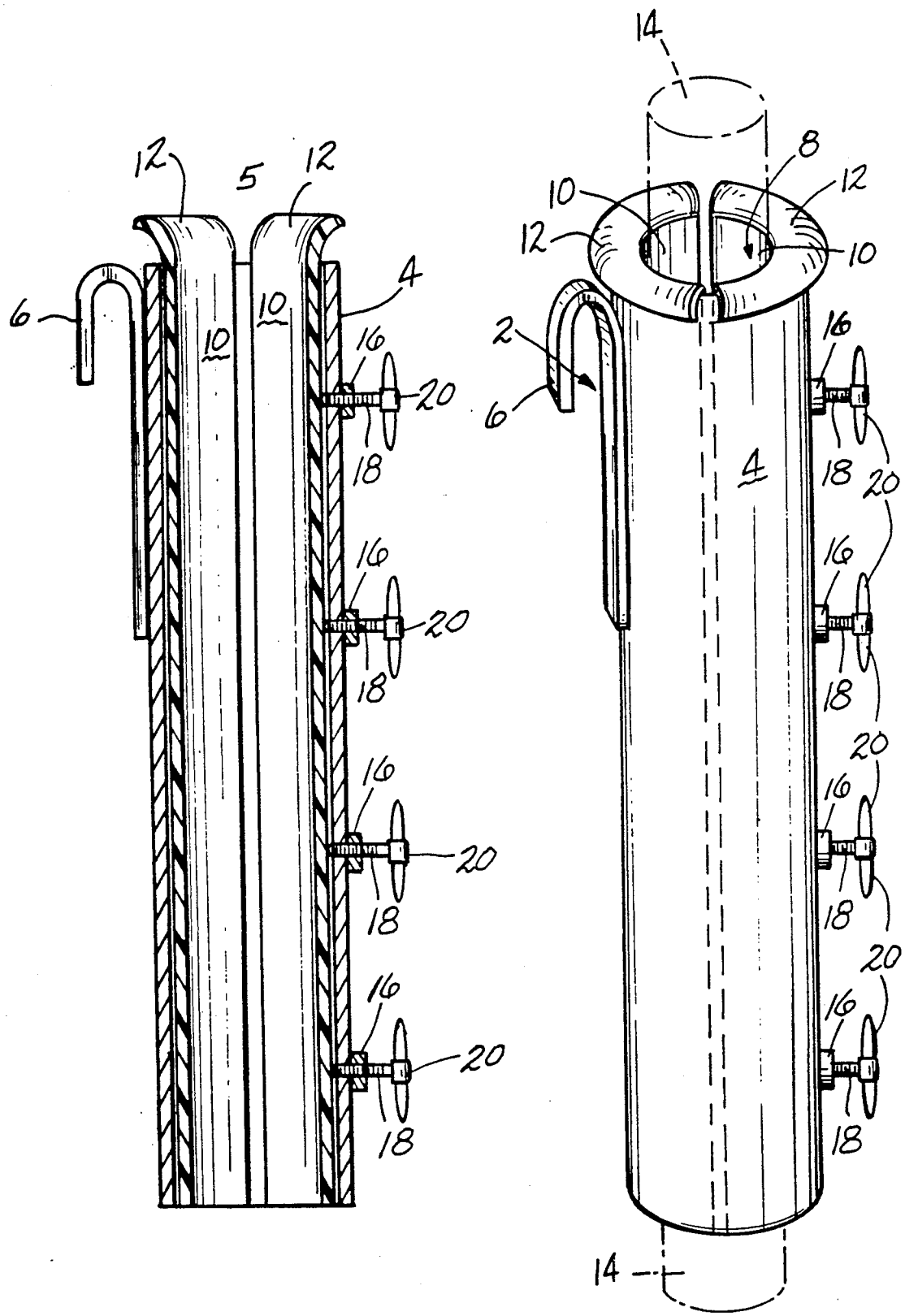

ELEVATOR TRAVELING CABLE GRIP

DESCRIPTION

1. Technical Field

This invention relates to a sleeve assembly for holding and supporting an elevator traveling or power cable in a construction elevator assemblage. More particularly, the sleeve assembly of this invention can be tightened onto the cable for support thereof, and can be loosened from the cable for repositioning on the cable when additional cable is fed out during use of the elevator assemblage.

2. Background Art

U.S. Pat. No. 3,519,101 Sieffert, granted July 7, 1970 discloses a construction elevator system which is used to operate an elevator during construction of a building. The system includes a machine and traction sheave mounted on machine beams which operates an elevator car suspended beneath the machine beams. From time to time during construction of the building, the machine, sheave, beams and car will be lifted to a higher location in the building by a crane at the building site. The traveling or power cable in the system is suspended in the hoistway at the machine room level, and at one or more lower levels by grips which are self tightening wire net type structures. When the assembly is lifted to a new level, the traveling cable is disconnected from the system controller and, after the new level has been reached, the traveling cable grips are detached from the building beams and lowered in the hoistway so as to pay out additional traveling cable down into the hoistway to be reconnected to the power source. Extra traveling cable is carried on a reel mounted on the assembly. When the necessary pay out of the traveling cable is completed, a new cable grip is placed on the traveling cable adjacent the machine room and suspended from a building beam.

The aforesaid procedure has several drawbacks. The traveling cable has an external elastomeric layer which can be cut or otherwise damaged rather easily. In highrise buildings it will be appreciated that the weight of the traveling cable can become an important factor as the building rises and the construction elevator system continues to be lifted higher and higher. The power source during the construction period for the traveling cable will be located in the hoistway pit or some other comparable lower area of the building. The net type grips disclosed in the aforesaid patent may cut or otherwise damage the external layer of the cable as the weight of the paid out cable increases. Also, the grips of this prior art must continuously be added to the cable at each raising of the assembly, and cannot be easily removed therefrom.

DISCLOSURE OF THE INVENTION

This invention relates to an improved traveling cable grip in the form of a sleeve and liner assembly which can be tightened onto and loosened from the traveling cable. The sleeve is a metal sleeve preferably having an integral hanger hook formed thereon for releasable connection to a building component, such as a beam or a component of the construction elevator machine room assembly. The sleeve is fitted with clamp screws which extend into the sleeve bore. The liner is preferably a split component which is made from a relatively pliant material such as polyvinylchloride. The sleeve clamps allow the liner to be clamped snugly against the traveling cable when the latter is to be supported by the grip in the building and also allow the liner to be loosened from the cable sufficiently to allow the cable grip to be slid along the cable as the latter is paid out from its reel after a jump of the construction elevator system. Once sufficient cable is paid out, and power can be reestablished to the controller and machine, the clamps are used to retighten the liner on the cable and the grip is once again hung in place in the hoistway to support the cable during subsequent operation of the elevator system.

It is therefore an object of this invention to provide an improved traveling cable grip for use in a construction elevator system for temporarily supporting the traveling cable in the hoistway during operation of the elevator system.

It is a further object of this invention to provide a cable grip of the character described which will not damage the traveling cable when in use.

It is an additional object of this invention to provide a cable grip of the character described which can be loosened from the cable and slid therealong as the cable is paid out from the elevator system.

It is another object of this invention to provide a cable grip of the character described which is inexpensive, of simple construction and can be reused.

These and other objects and advantages of the invention will become readily apparent from the following detailed description of a preferred embodiment thereof when taken in conjunction with the accompanying drawings, in which:

Brief Description of the Drawings

FIG. 1 is a perspective view of a preferred embodiment of the cable grip of this invention; and FIG. 2 is an axial sectional view of the cable grip of FIG. 1.

Best Mode For Carrying Out The Invention

Referring now to FIG. 1 and FIG. 2, the cable grip, denoted generally by the numeral 2, includes an outer sleeve 4 preferably formed from steel. The grip sleeve 4 has a hanger hook 6 welded thereto for suspending the grip 2 in the elevator hoistway. A liner 8 is disposed in the bore of the sleeve 4, the liner 8 being formed in split halves 10, each of which has an outwardly flared collar 12 formed thereon. The liner halves 10 are preferably formed from a pliant material such as PVC, or the like so as not to damage the traveling cable 14 (shown in phantom) which passes through the interior of the liner 8. The collars 12 are operable to ensure that the liner halves 10 stay in place in the grip 2 when the latter is slid upwardly over the cable 14 during payout of extra cable after a jump of the elevator assembly has been made. A plurality of bosses 16 are welded to the sleeve 4. The bosses 16 each have threaded bores 18 which pass through the sleeve 4 into the sleeve bore 5. Thumb screws 20 are threaded into the boss bores 18 and engage one of the liner halves 10. When the thumb screws 20 are tightened down, they press the liner half 10 against the cable 14 and firmly, but gently lock the cable 14 in the grip 2. Conversely, when the thumb screws 20 are loosened, the liner half 10 will move off of the cable 14 to allow the grip 2 and cable 14 to slide axially relative to each other.

It will be readily apparent to those skilled in the art that the grip of this invention is of simple construction, rugged, and yet gentle with the traveling cable. The ability to loosen and tighten the liner halves on the cable provides versatility and eliminates the need to use a new cable grip after each elevator system jump. The integral hanger hooks allow the grip to be hung on brackets in the hoistway, on building beams, or on a railing or the like on the elevator machine room portion of the system.

Since many changes and variations of the disclosed embodiment of the invention may be made without departing from the inventive concept, it is not intended to limit the invention otherwise than as required by the appended claims.

What is claimed is:

1. An elevator traveling cable grip comprising:
   a. a sleeve;
   b. a liner disposed in said sleeve and extending for substantially the entire length of said sleeve, said liner being formed from a pliant material which will not damage the traveling cable and segmented axially; said liner being operable to encircle the traveling cable; and
   c. variable clamping means mounted on said sleeve and engageable with said liner whereby the liner can be tightened on and loosened from the traveling cable.

2. The grip of claim 1 further comprising a hook formed on said sleeve for suspending the grip in a hoistway.

3. The grip of claim 1 wherein said liner is formed with a collar which extends beyond an end of said sleeve to maintain said liner in said sleeve when the grip is slid over the traveling cable.

4. The grip of claim 1 wherein said liner is polyvinylchloride.

5. An elevator traveling cable grip comprising:
   a. a steel sleeve;
   b. a pliant liner disposed in said sleeve, said liner having a radially outwardly flared collar operable to hold said liner in place in said sleeve when the grip is slid over the traveling cable and said liner being split axially and operable to encircle the traveling cable; and
   c. variable clamping means mounted on said sleeve and engageable with said liner whereby the liner can be tightened on and loosened from the traveling cable.

6. The grip of claim 5 further comprising a suspension hook found on said sleeve for suspending the grip in an elevator hoistway.

* * * * *